United States Patent [19]
Pan et al.

[11] Patent Number: 5,139,668
[45] Date of Patent: Aug. 18, 1992

[54] HOLLOW FIBER BUNDLE ELEMENT

[75] Inventors: Chuen Y. Pan; Curtis W. McMinis, both of Edmonton, Canada

[73] Assignee: Alberta Research Corporation, Edmonton, Canada

[21] Appl. No.: 618,424

[22] Filed: Nov. 27, 1990

Related U.S. Application Data

[63] Continuation-in-part of Ser. No. 562,295, Aug. 3, 1990, abandoned, which is a continuation-in-part of Ser. No. 457,643, Dec. 27, 1989, abandoned.

[51] Int. Cl.$^5$ ............................................. B01D 63/02
[52] U.S. Cl. ........................... 210/321.8; 210/500.23; 210/502.1
[58] Field of Search .............. 210/321.75, 638, 500.23, 210/34.8, 266, 502.1, 656, 639, 641

[56] References Cited

U.S. PATENT DOCUMENTS 4,247,393 1/1981 Wallace ..................... 210/34.75 X
4,963,264 10/1990 Davis ................................ 210/638

Primary Examiner—Frank Spear
Attorney, Agent, or Firm—Millen, White & Zelano

[57] ABSTRACT

A hollow fiber bundle element comprises a bundle of microporous hollow fibers disposed in a cylindrical impermeable casing. Each fiber, wall provide a permeability in the microfiltration range (0.05 to 5 micrometers). The bundle forms two longitudinal passageways, being the lumina of the fibers and the other being the void space between the fibers. A first of these passageways is densely and uniformly packed with minute solid particles. No binder is used to fix the particles—they maintain their distribution in the passageway as a result of having been densely packed under pressure. The ends of the first passageway are sealed, and since the fiber wall pores are smaller than the particles, the particles are immobilized therein. The hollow fiber module packed with minute adsorbent particles in the first passageway provides an adsorber. A fluid mixture comprising a carrier and an adsorbate is introduced into the second passageway, and diffuses through the fiber walls and is collected by the adsorbent particles. The use of small adsorbent particles enhances adsorption rate, and availability of a separate longitudinal flow passageway reduces pressure drop across the adsorber. Alternatively, the hollow fiber module may be packed with minute catalyst particles to provide an effective catalytic reactor with improved mass transfer between the catalyst particles in the first passageway and surrounding fluid containing the reactants, in the second passageway.

19 Claims, 1 Drawing Sheet

HOLLOW FIBER BUNDLE ELEMENT

CROSS-REFERENCE TO RELATED APPLICATION

This is a continuation-in-part of application Ser. No. 07/562,295 filed Aug. 3, 1990, now abandoned, which is a continuation-in-part of application Ser. No. 07/457,643, filed Dec. 27, 1989, now abandoned.

FIELD OF THE INVENTION

This invention relates to a hollow fiber bundle element which may be packed in a first passageway with minute solid particles, such that the particles may interact with fluid components in a second passageway.

BACKGROUND OF THE INVENTION

Adsorption processes are widely used in industry for separation of fluid mixtures (gas or liquid). The separation is based on preferential adsorption of selective components on the surface of solid adsorbents. For efficient separation, the adsorbent material must have large surface areas to provide reasonable adsorptive capacities. The commonly used adsorbents, such as molecular sieve zeolites, activated carbon, alumina and silica gel, have surface areas of at least 200 $m^2/g$.

Most industrial adsorption processes are carried out in fixed-bed type columns. The adsorbent granules are packed and immobilized in a cylindrical vessel. As the fluid mixture to be separated is passed through the packing via the void spaces among the granules, the adsorbable components in the mixture are taken up and retained by the adsorbent.

Since the adsorbent has a limited adsorption capacity, it will become gradually saturated with adsorbate, and periodic adsorbent regeneration is required. For continuous processing of a feed mixture, a multi-bed system is used in which each bed goes through the adsorption/regeneration cycle in sequence. Several different regeneration methods have been used commercially. Chief among them are the thermal swing adsorption (TSA) and pressure swing adsorption (PSA) processes. In the TSA process, the saturated adsorbent is regenerated by purging with a hot gas. Each heating/cooling cycle usually requires a few hours to over a day. In the PSA process, the adsorbent regeneration is effected by purging with a portion of the purified product gas at reduced pressure. The throughput is higher than that of the TSA since faster cycles, usually in minutes, are possible.

Apart from the adsorptive capacity of the adsorbent, the adsorption rate and pressure drop are two important factors that must be considered in adsorber design.

Pressure drop through the adsorber column should be minimized, because high fluid pressure drop can cause movement or fluidization of the adsorbent particles, resulting in serious attrition and loss of the adsorbent.

The adsorption rate has a significant bearing on the efficiency of the adsorption process. This rate is usually determined by the mass transfer resistance to adsorbate transport from the bulk fluid phase to the internal surfaces of the adsorbent particles. Slow adsorption rate due to large mass transfer resistance will result in a long mass transfer zone (MTZ) within which the adsorbent is only partially saturated with adsorbate. The adsorbent in the region upstream of the MTZ is substantially saturated with adsorbate, while that downstream of the MTZ is essentially free of adsorbate. As the fluid continues to flow, the MTZ advances through the adsorber column in the direction of the fluid stream. The adsorption step must be terminated before the MTZ reaches the adsorber outlet in order to avoid the breakthrough of adsorbate in the effluent stream. A long mass transfer zone, which contains a large quantity of partially utilized adsorbent, will, therefore, result in a short adsorption step and inefficient use of the adsorbent capacity. These effects are especially serious for the pressure swing adsorption process.

Both the pressure drop and the mass transfer resistance are strongly influenced by the size of the adsorbent particles. Changing the particle size, unfortunately, has opposite effects on these two important factors. This is elaborated below:

(1) The pore sizes of the void spaces among the adsorbent particles in the fixed-bed are proportional to the size of the particles. Since the resistance to the fluid flow through the adsorber is inversely proportional to the pore size of the packed bed, the use of small adsorbent particles will cause high pressure drop. For this reason, the sizes of particles of commercial adsorbents for fixed-bed operation are generally larger than 2 mm in equivalent diameter. Adsorbent of smaller particle sizes, such as zeolite crystals (less than 10 microns), are pelletized using binding material to suitable sizes.

(2) Almost all the surface areas of commercial adsorbents are located at the interior of the adsorbent particle. For adsorption to occur, the adsorbate needs to be transported from the external fluid phase to the interior surface of the particle. The transport rate is dominated by two mass transfer mechanisms in series: (a) interfacial mass transfer—diffusion through the fluid boundary layer surrounding the external surface of the adsorbent particle; and (b) intraparticle mass transfer—diffusion through the internal pore space (micropores and macropores) of the particle to its interior surface where adsorption takes place. The size of the particle has significant effects on the rates of these two diffusion processes. Small particles offer large fluid/solid contact areas in the fixed bed for interfacial mass transfer and reduce the path length for the intraparticle diffusion. Hence, small adsorbent particles will increase adsorption rate and result in a narrow mass transfer zone for fast and efficient operation of adsorption/desorption cycles.

The above discussions and analysis show that small adsorbent particles are desirable for efficient adsorption processes, but the minimum particle size is limited by acceptable hydrodynamic operating conditions of the fixed bed adsorber. That is, one wants to avoid fluidization and excessive pressure drop. Such a concept also applies to a heterogeneous catalytic reaction process, which involves an adsorption step in the reaction mechanism. The use of small catalyst particles will enhance mass transfer between the catalyst and surrounding fluid carrying the reactants, but it will also increase pressure drop through the reactor bed.

It would therefore be desirable to provide an adsorber or catalytic reactor containing adsorbent or catalyst characterized by a relatively small particle size and yet still able to operate with an acceptable pressure drop.

At this point, it is appropriate to shortly describe the structure and operation of a known separation device used for permeation and absorption and referred to as a hollow fiber module. As will become clear below, this module is similar in many respects to a shell and tube heat exchanger. The device is used to separate at least one component (e.g. $CO_2$) from a second 'carrier' component (e.g. natural gas) with which it forms a feed mixture. A typical module comprises a cylindrical vessel encapsulating a bundle of small-diameter, elongated, hollow fibers. The fibers are formed of a material having a permeability which, in the case of a permeation module, is selected to allow the component to be extracted to diffuse therethrough but to substantially reject the carrier component. In the case of an absorption module, the entire feed mixture may readily diffuse through the fiber wall. The fibers are "potted" at their ends in closure means, such as epoxy tube sheets, so that the ends of the fibers project therethrough, leaving their bores or "lumina" open. The tube sheets function to seal the void space between the fibers at the two ends. The tube sheets further seal or are sealed by means, such as an O-ring, against the inside surface of the vessel. The vessel is provided with a first inlet and first outlet communicating with the ends of the fiber lumina. It further has a second inlet and second outlet communicating with the ends of the void space. In operation, the feed mixture of gases is fed through the second inlet into the void space. In the case of an absorption module, absorbent fluid is fed into the lumina. The absorbate ($CO_2$) diffuses through the fiber walls from the void space, is collected by the absorbent fluid, and exits through the first outlet. The carrier gas, reduced in $CO_2$, leaves through the second outlet.

With this background in mind, it is now appropriate to describe the present invention.

SUMMARY OF THE INVENTION

The present invention involves use of a known article, namely a module comprising a bundle of hollow fibers contained in an impermeable casing. The bundle may be used to provide interaction between minute solid particles and a feed stream component or components. The fibers each have a microporous permeable wall having pore openings in the range of about 0.05-5 micrometers (known as the "microfiltration range"). The minute solid particles are emplaced in a first of two passageways, either the lumina of the fibers or the void space between the fibers. The particles are sufficiently densely packed substantially throughout the length and breadth of the passageway, so as to have a density equal to or greater than the free-standing bulk density of the particles. The particles are sufficiently small or minute so as to provide fast mass transfer of the feedstream component or components to the particles where interaction takes place. They are "free" particles, not being bonded together by binder or the like. The first passageway containing the particles is sealed at its ends, for example by an epoxy tube sheet. The pore openings of the fiber wall are smaller than the particles involved. These openings, however, are large enough to permit the fluid to diffuse therethrough.

The particles are emplaced in the module in a unique fashion. More particularly, a suspension of the particles in a liquid or gas carrier is pumped under pressure into one of the passageways. The carrier filters through the fiber walls into the other passageway and exits the module, leaving the particles trapped in the original passageway. By this process, a dense uniform dispersion of particles is emplaced in the original passageway throughout its length. The particles are individually free but are collectively immobilized in the original passageway due to the completeness of the packing.

The final product, comprising the casing, the hollow fibers, the end closures, and the charge of particles, is hereafter referred to as the "element".

As a result of assembling the foregoing, minute solid particles having fast mass transfer rate are immobilized in the sealed first passageway of the element. Yet feedstream components of a fluid stream that is introduced into the other or second passageway, can still reach and interact with the particles by diffusing through a fiber wall to enter the first passageway.

The pore openings of the fiber wall are sufficiently large to enable the carrier liquid or gas to filter readily therethrough during the fabrication step of emplacing the packing of particles in one of the passageways.

In this fashion, it is feasible to fabricate the element without high expense and it is possible to use very small particles having a very high mass transfer rate, in connection with a pressure-driven fluid mixture to be processed, without having fluidization occur. And the availability of the second passageway, for the passage therethrough of the fluid mixture, has ensured that only a relatively low pressure drop will occur across the element.

In one embodiment, the element may be an adsorber. The feedstream then contains an adsorbate. The particles packed in the first passageway are adapted to adsorb the adsorbate from the fluid stream as it flows through the element. An adsorbate-depleted stream is the result.

In another embodiment, the element may be a catalytic reactor. In this case the feedstream contains reactants. The particles packed in the first passageway are adapted to catalyze reaction between the reactants in the feedstream as it flows through the element. Reaction products in the end stream is the result.

DESCRIPTION OF THE PREFERRED EMBODIMENT

Figure 3:
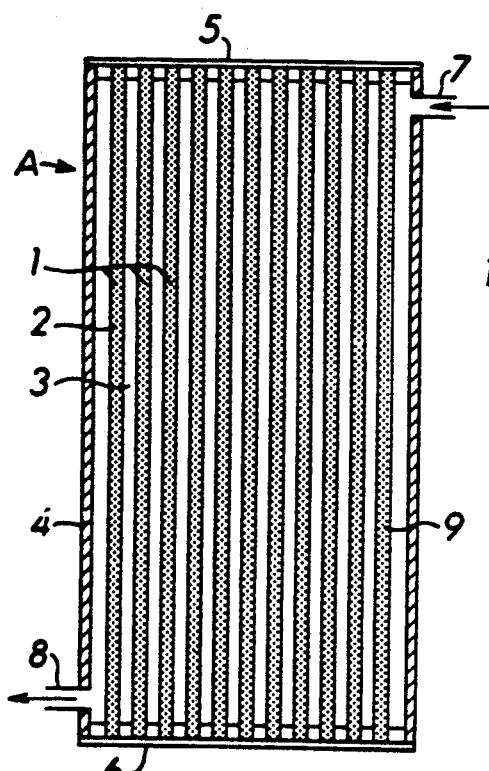
FIG. 3 is a schematic showing an element, having the particles in the lumina, being used to provide interaction between the particles and a feedstream.
Figure 4:
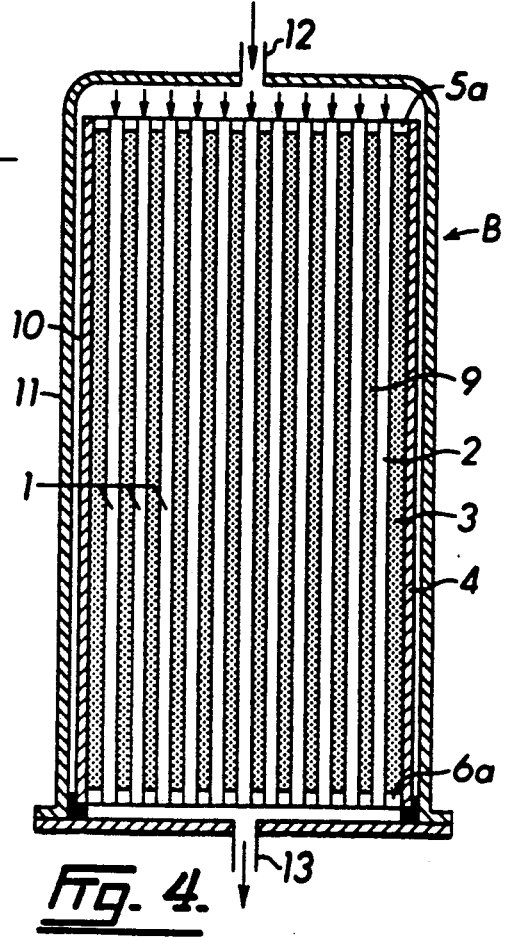
FIG. 4 is a schematic showing an element, having the particles in the void space between the fibers, being used in conjunction with a vessel to provide interaction between the particles and a feedstream.

The element A can take one of two forms, shown in FIGS. 3 and 4 (which are not to scale).

In FIG. 3 the element A is the element itself an comprises a bundle of fibers 1, each fiber having a bore or lumen 2. The plurality of fibers form a void space 3 between them. An impermeable cylindrical casing 4 contains the bundle. The bundle has top and bottom closures 5, 6 which seal the lumina 2 and void space 3. An inlet 7 is provided at one end of the casing 4, for introducing the feed mixture, and an outlet 8 is provided at the opposite end of the casing for exhausting a stream after interaction with the particles. Particles 9 are packed in the lumina 2. The fiber walls have sub-micron sized pores which enable the feedstream components to diffuse readily therethrough but the pores are smaller than the particles 9. As a result of providing fiber walls that prevent the particles 9 from moving therethrough and sealing the ends of the lumina 2 with the closures 5,6, the particles 9 are immobilized in the lumina 2.

In FIG. 4, the element B has the particles 9 disposed in the void space 3 between the fibers 1. Closures 5a, 6a are provided and leave the ends of the lumina 2 open but seal the ends of the void space 3. The element 10 of FIG. 4, comprising the bundle of fibers 1, closures 5a, 6a and casing 4, is positioned in a vessel 11 having a top inlet 12 and bottom outlet 13. The inlet 12 and outlet 13 communicate with the ends of the lumina 2.

From the foregoing, it will be noted that each of the elements provides a continuous longitudinal flow passageway. In the case of the element A, the passageway is the void space 3. In the case of the element B, the passageway is provided by the lumina 2. For separation of fluid mixtures, the feed is directed to flow through the flow passageway. Since the thin and porous fiber wall has negligible mass transfer resistance, the fluid is always in intimate and substantially uniform contact with the particles 9. The elements A, B when used as adsorbers are adapted for use with PSA and TSA systems in accordance with known technology.

Typically the hollow fibers will have a lumen diameter less than 2 mm. The fiber wall will typically have pore openings of about 0.5 micrometer in equivalent diameter.

Figure 1:
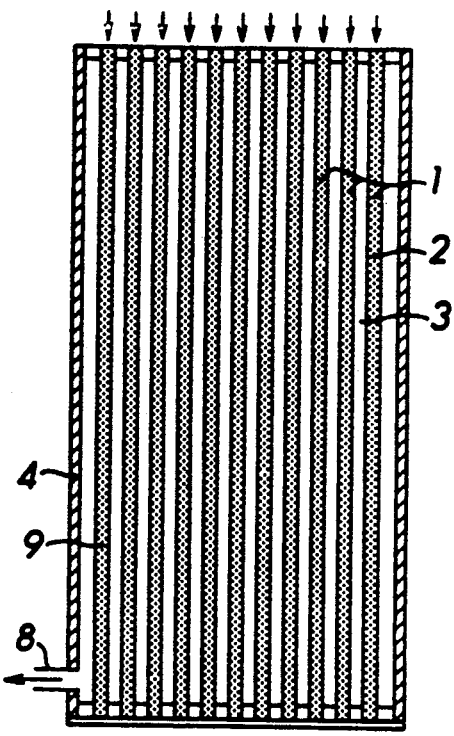
FIG. 1 is a schematic showing the arrangement used to emplace particles in the lumina of an element.
Figure 2:
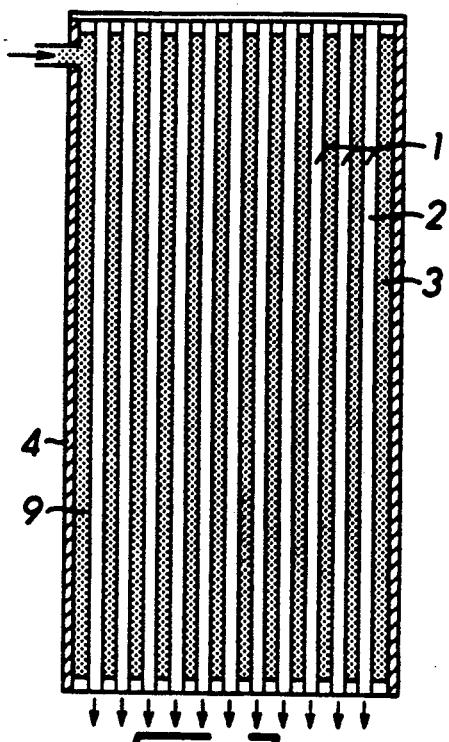
FIG. 2 is a schematic showing the arrangement used to emplace particles in the void space between the fibers.

The solid particles or crystals (referred to collectively as "particles") can be packed into the lumina 2 or void space 3 using one of several techniques. More particularly, in the case of non-soluble particles, they are first suspended by agitation in a liquid or gas carrier, such as alcohol, water or air. The suspension is then pumped into the lumina 2 or void space 3, as shown in FIGS. 1 or 2. The liquid or gas carrier is able to permeate readily through the microporous fiber wall. In the case of pumping the slurry into the lumina 2 (FIG. 1), the top ends of the lumina are open, to receive the feed and the bottom ends are sealed. The particles 9 become trapped in the lumina while the carrier diffuses through the fiber walls and exits through an outlet 8 in the casing 4. In this fashion, a charge of densely packed particles may be accumulated to fill the lumina substantially throughout its length. The top ends of the lumina can then be sealed to immobilize the particles. Similarly, in the case of pumping the slurry into the void space 3 (FIG. 2), the top ends of the lumina 2 and the void space 3 are closed and the bottom ends of the lumina are left open. The slurry enters the void space, the carrier passes through the fiber walls and exits out the bottom of the lumina, and the particles 9 remain trapped in the void space 3. In both cases, loading may be facilitated by vibration by immersing the module in an ultrasonic bath.

In the case of soluble materials, the element, having fibers that will not be wetted by the solvent, can be packed by filling a first passageway of the module with the solution and then drying or leaching out the solvent by circulating air or non-solvent through the second passageway of the module.

When the element is used as an adsorber, the particles will be adsorbent particles, preferably selected from the group consisting of molecular sieve zeolites, silica gel, activated alumina, carbon black, and activated carbon. The particle size preferably will be less than 30 microns, most preferably 1–30 microns. The surface area preferably should be at least about 200 m$^2$/g.

Still another class of materials that can be used as the adsorbent are those that can be cast in-situ to form a microporous structure by the sol-gel phase inversion techniques. (See Example 2 and Robert E. Kesting, "Synthetic Polymeric Membrane", 2nd Edition, John Wiley, N.Y., 1985). A typical sol-gel process for forming porous structure comprises: preparing a solution of polymeric material, solvent, non-solvent and swelling agent; evaporating or leaching the solvent with non-solvent; and drying the non-solvent.

The present hollow fiber element has certain advantages over conventional packed bed elements, namely:

(1) In the hollow fiber element, the fluid pressure drop through the element is independent of the size of the particles, because the fluid flow path is separated from the particles by the microporous fiber walls;

(2) The hollow fiber element can use very fine particles. This will reduce mass transfer resistance, because the use of small particles increases the fluid/solid interfacial mass transfer areas and reduces the intraparticle diffusion path length. In addition, for adsorbers the binder materials contained in the larger pelletized adsorbents used in conventional adsorbers is eliminated, resulting in higher adsorptive capacities;

(3) The hollow fiber element broadens the choice of materials for the particles. It can use a wide range of powder materials. If the particle size is small enough, the particles need not be of porous material, because small particles have large external surface areas;

(4) The hollow fiber adsorber can use microporous and adsorptive structure that can be cast into either the lumina or void space of the module. Many plastic materials can be converted to microporous matrices by the so-called phase inversion technique (see Example 2). The fiber wall provides a partition between the matrix and the flow passageway in the fiber module;

(5) The microporous hollow fibers provide efficient and uniform contact between the particles and the fluid mixture for a wide range of flow rates, thereby avoiding the channelling problems that can affect conventional elements;

(6) The fast mass transfer and low pressure drop of the hollow fiber adsorber enables the PSA process to be operated efficiently at fast cycle and high feed rates.

The invention is illustrated by the following examples:

EXAMPLE I

This example sets forth in detail an embodiment of the best mode presently known to applicants for packing one of the passageways with a charge of particles. It further describes the character of the charge so emplaced.

Three hollow fiber modules were made using microporous polypropylene Celgard[1] hollow fibers manufactured by the Hoechst Celanese Corporation (Charlotte, N.C.). The physical parameters of these modules are given in the following Table. Element 1 was packed with molecular sieve zeolite crystals in the fiber lumina (see FIG. 1) using cyclohexane as the carrier fluid. Element 2 was packed with activated carbon powder in the void space between fibers (see FIG. 2) using methanol as the carrier fluid. Both elements were packed using 20 psi slurry solution of adsorbent particles suspended in the carrier fluid, driven by a diaphragm pump. The slurry pumping operation was then followed by dry nitrogen circulation to dry out the carrier fluid from adsorbent particles. Element 3 was packed with molecular sieve zeolite crystals in the void space between the fibers, using 200 psi helium as the carrier fluid. As shown in the Table, the resulting hollow fiber elements have adsorbent particle packing density considerably greater than the free standing particle bulk density. The packing was uniform throughout the length and breadth of the packing space.
1 Trade-Mark

TABLE 1

Physical Parameters of Hollow Fiber Adsorber Elements

| Hollow Fiber Module | Element 1 | Element 2 | Element 3 |
|---|---|---|---|
| casing, ID, cm | .48 | .45 | .48 |
| fiber type | Celgard[2] X20-400 | Celgard[3] X20-200 | Celgard[4] X20-200 |
| fiber number | 60 | 132 | 150 |
| active fiber length, cm | 65 | 64 | 70 |
| fiber ID, micrometer | 400 | 200 | 200 |
| fiber OD, micrometer | 460 | 260 | 260 |
| fiber wall porosity, % | 40 | 40 | 40 |
| fiber wall pore opening, micrometer (width × length) | .065 × .19 | .065 × .19 | .065 × .19 |
| Adsorbent Packings | | | |
| packing location | fiber lumina | outside fibers | outside fibers |
| adsorbent type | Union Carbide 5A | Darco[5] KB Carbon | Union Carbide 5A |
| particle size, micrometer | <10 | <30 | <10 |
| particle bulk density, g/cc (free standing) | .49 | .25 | .49 |
| packing density, g/cc | .53 | .40 | .64 |
| total packing weight, g | 2.6 | 2.3 | 4.6 |

[2] Trade-Mark
[3] Trade-Mark
[4] Trade-Mark
[5] Trade-Mark

EXAMPLE II

This example illustrates the use of very fine, non-soluble adsorbent particles in a hollow fiber adsorber for gas separation.

Two hollow fiber modules were made containing microporous polypropylene Celgard[5] X10-400 hollow fibers. The fiber had a 400 micron internal diameter lumen and 30 micron thick wall. The fiber wall had 30% porosity provided by 0.065×0.19 microns pore openings. Each of the test modules had 30 open-ended fibers of 50 cm length encased in a 3/16 inch OD stainless steel tube (0.375 cm ID) with both ends of the fiber bundle potted in 3 cm long polyurethane tube sheets.
5 Trade-Mark The previously described filtration technique was used to pack a type Y zeolite powder (less than 10 micron size) into the modules. One module was packed with 1.3 g of powder in the fiber lumen, and the other was loaded with 1.7 g of the same powder in the void space between the fibers. The different modes of adsorbent loading were chosen only to demonstrate the workability of each version of the process.

The two modules were plumbed and instrumented to operate as a cyclic pressure swing adsorption (PSA) system in accordance with C. W. Skarstrom, U.S. Pat. No. 2,944,627. The cyclic operation was automated with an 8 port valve directing the gas to and from the inlets and outlets of the two adsorbers. The valve was, in turn, driven by a solenoid controlled by a programmable timer.

The PSA system was used to purify a feed stream consisting of helium gas containing 1% $CO_2$. In the first step of the PSA cycle, the feed gas, at 200 psig and 23° C., was fed to the first adsorber for $CO_2$ removal at a rate of 200 cc (STP)/min. Simultaneously a portion (25 cc/min.) of the purified helium was throttled down to about 6 psig and supplied to the second adsorber to purge previously adsorbed $CO_2$. The remainder, still at high pressure, was taken off as purified helium product.

After 3.5 minutes, the timer switched the system into the second step of operation. At the beginning of this step, the first adsorber was de-pressurized to atmospheric pressure and the second adsorber was pressurized with feed gas. It then started the adsorption and purging operations for the second and first adsorbers, respectively. The duration of the second step was the same as the first step, and the system was alternated between these two steps in cyclic fashion. The gas flow direction in each adsorber for adsorption and pressurization cycles was countercurrent to that for purging and de-pressurization cycles.

A thermal conductivity gas analyzer was used to measure the $CO_2$ concentration in helium. The test results showed that the microporous hollow fiber module, packed with minute adsorbent particles, in both versions, was effective for gas purification by pressure swing adsorption, because no $CO_2$ could be detected in the purified effluent helium.

EXAMPLE III

This example illustrates the use of the sol-gel phase inversion technique for casting a microporous matrix into the hollow fiber module for use as an adsorbent.

A hollow fiber module was made using microporous polypropylene Celgard hollow fibers of 240 micron ID and 30 micron wall thickness. The fiber wall had 30% porosity with 0.065 ×0.19 micron pore openings. The module had 60 50-cm long fibers encased in a 3/16 inch OD nylon tube, with both ends of the fiber bundle potted in 3 cm long polyurethane tube sheets.

A microporous cellulose acetate matrix structure was cast into the void space between the fibers by first filling it with a cellulose acetate solution (made of 22 g cellulose acetate, 132 g acetone, 30 g water and 10 g $ZnCl_2$), and then circulating water through the fiber lumina to leach out the acetone, followed by dry air circulation to remove water.

The element was tested for gas dehydration. The water content in the gas was measured using a hygrometer. An air containing 0.04% water vapour at 80 psig and 23° C. was fed to the module through the lumina at a rate of about 400 cc (STP)/min and dry air, containing only 20 ppm of water, was obtained from the element outlet.

The moist air started to break through the element outlet only after about 20 minutes of operation. The water saturated cellulose acetate was able to be regenerated by purging the element with 6 psig dry air at 100 cc/min for about 20 minutes.

EXAMPLE IV

This example illustrates the use of non-porous soluble particles as an adsorbent in the hollow fiber adsorber. A hollow fiber module similar to the one described in Example 2 was packed with $CuCl_2$ powder by filling the void space between the fibers with a 60° C. concentrated aqueous $CuCl_2$ solution (67% $CuCl_2$ by weight) followed by dry air circulation through the fiber lumina to remove water. The module was tested for air dehydration, as described in Example 2. An air containing 0.052% water vapour was fed to the module through the fiber lumina at 80 psig, 23° C., and 500 cc(STP)/min. Dry air containing 110 ppm of water was obtained from the outlet of the element. The moist air started to break through the element outlet after about 24 hours of operation. The water-saturated $CuCl_2$ was regenerated by purging the element with 100 cc/min. dry air at 100° C. for 12 hours.

EXAMPLE V

This example illustrates the efficiency of the hollow fiber adsorber in the fast-cycle pressure swing adsorption process for high feed gas flow rates.

A hollow fiber module was made containing polypropylene Celgard hollow fibers. The fiber had a 200 micron ID and 30 micron thick wall. The fiber had 40% porosity provided by about 0.065×0.19 micron pore openings. The module had 132 open-ended fibers of about 70 cm length encased in a ¼ inch OD nylon tube (0.44 cm ID) with both ends of the fiber bundle potted in 3 cm long epoxy tube sheets.

The previously described filtration technique, with the aid of ultrasonic vibration, was used to pack 2.3 g Darco KB[6] activated carbon powder (particle size less than 30 microns) into the void space between the fibers.
[6]Trade-Mark The element was plumbed and instrumented as a pressure swing adsorber operating according to the following sequential steps in cycle:
(1) Adsorbing adsorbate from a high pressure feed gas for a predetermined time period to obtain purified gas from the adsorber outlet;
(2) Depressurizing the gas remaining in the adsorber (after the adsorption step) through its outlet and into a first gas storage vessel having an internal volume approximately equal to the internal void volume of the adsorber;
(3) Further depressurizing the gas in the adsorber into a second gas storage vessel having the same internal volume;
(4) Venting the remaining gas in the adsorber through its inlet;
(5) Purging the adsorber using the gas stored in the second storage vessel; the purge gas flow direction being countercurrent to the feed gas direction in the adsorption step;
(6) Pressurizing the adsorber using the gas stored in the first storage vessel; the remaining gas in the storage vessel is then removed as low pressure product;
(7) Further pressurizing the adsorber to feed gas pressure using a portion of the purified high pressure product gas, and thus readying the adsorber for the next adsorption cycle.

The aforementioned hollow fiber absorber containing 2.3 g of minute activated carbon particles was used to purify a 314 psia hydrogen gas containing about 10% $CO_2$ using the above pressure swing absorption steps. In the tests, we varied the feed gas flow rate and determined the corresponding maximum permissible absorption step time without any $CO_2$ breakthrough from the absorber outlet. The following results were obtained:

| Adsorption Step Time Seconds | Maximum Permissible Feed Rate (Without $CO_2$ Breakthrough) cc (STP)/min. |
| --- | --- |
| 180 | 200 |
| 120 | 300 |
| 72 | 500 |
| 36 | 1,000 |
| 17 | 2,000 |
| 10 | 3,600 |

It is seen that the maximum permissible feed gas rate is inversely proportional to the adsorption step time. The corresponding hydrogen recovery for each of these flow rates is virtually identical and equal to about 76%.

These test results clearly indicate that the feed gas throughput of a hollow fiber adsorber can be effectively increased without loss of separation efficiency by simply shortening the PSA cycle time. The high adsorption efficiency at short adsorption cycle time and high feed rate is made possible by the fast mass transfer rate and low gas pressure drop in the hollow fiber adsorber using minute adsorbent particles.

EXAMPLE VI

This example illustrates the use of the hollow fiber module as a catalytic reactor having minute catalyst particles.

A hollow fiber module similar to the one described in Example III was packed according to the method in Example I with 1.17 g of minute catalyst particles in the void space between fibers. The catalyst consists of 1% weight of palladium on alumina powder of about 25 micron particle size (AP-4 heterogeneous catalyst manufactured by Engelhard Corporation of Newark, N.J. U.S.A.). The module was tested for room temperature deoxygenation process for converting oxygen and hydrogen into water. A hydrogen gas containing about 0.66% oxygen at 10 psig was passed through the fiber lumina of the module. A gas chromatographic instrument was used to measure oxygen content in the gas. At 700 cc (STP)/min. feed gas flow rate, no oxygen content could be detected from the effluent stream of the module, indicating complete conversion of oxygen to water. This highly efficient deoxygenation process was due mainly to the fast mass transfer between the gas stream and catalyst resulting from the use of small catalyst particles in the hollow fiber module.

The scope of the invention is defined by the claims now following.

The embodiments of the invention in which an exclusive property or privilege is claimed are defined as follows:

1. A hollow fiber element used to provide interaction between minute solid particles and a particular component or components of a feedstream, comprising:
   a bundle of hollow fibers, each fiber having a wall having effective pore diameters in the range of about 0.05 to 5 $\mu$m, each fiber forming a lumen, said lumina and the void space between the fibers providing two longitudinal passageways extending through the bundle, said bundle having means at each end for sealing a first of the passageways;
   an impermeable casing sealing the side periphery of the bundle; and
   a charge of individually free, minute solid particles packing the first passageway substantially throughout its length and breadth, said charge having a density substantially equal to or greater than the free-standing bulk density of the particles, said particles being adapted to interact with the feedstream component or components;

the pores of each fiber wall being smaller than the particles;

said particles being immobilized in the first passageway but accessible to the component or components introduced into the second passageway in the feedstream.

2. The element as set forth in claim 1 wherein:
the surface area of the particles is at least about 200 m²/g;
the fiber wall has pore openings whose effective diameters are in the range of about 0.05 to 5 micrometers; and
the particle size is less than 30 microns.

3. The element as set forth in claim 2 wherein:
the particles are selected from the group consisting of molecular sieve zeolites, silica gel, activated alumina, carbon black and activated carbon.

4. The element as set forth in claim 1, wherein:
the hollow fiber element is a catalytic reactor; and
the particles are adapted to catalyze a reaction between reactants in the feedstream.

5. The element as set forth in claim 4 wherein:
the surface area of the particles is at least about 200 m²/g;
the fiber wall has pore openings whose effective diameters are in the range of about 0.05 to 5 micrometers; and
the particle size is less than 30 microns.

6. The element as set forth in claim 1, wherein:
the hollow fiber element is an adsorber; and
the particles are adapted to adsorb an absorbate in the feedstream.

7. The element as set forth in claim 1, wherein:
the hollow fiber element is a catalytic reactor; and
the particles are adapted to catalyze a reaction between reactants in the feedstream.

8. A hollow fiber element used to provide interaction between minute solid particles and a particular component or components of a feedstream, comprising:
a bundle of hollow fibers, each fiber having a wall having effective pore diameters in the range of about 0.05 to 5 μm, each fiber forming a lumen, said bundle having means at each end for sealing the lumina of the fibers and the void space between the fibers;
an impermeable casing sealing the side periphery of the bundle;
first means for introducing the feedstream into one end of the void space between the fibers and second means for removing the stream after interaction from the other end of the void space;
a charge of individually free, minute solid particles, packing each lumen substantially through its length and breadth, said charge having a density substantially equal to or greater than the free-standing bulk density of the particles, said particles being adapted to interact with the feedstream component or components;
the pores of each fiber wall being smaller than the particles;
said particles being immobilized in the lumina but accessible to the component or components introduced into the void space between the fibers in the feedstream.

9. The element as set forth in claim 8, wherein:
the hollow fiber element is an adsorber; and
the particles are adapted to adsorb an absorbate in the feedstream.

10. The element as set forth in claim 8, wherein:
the hollow fiber element is a catalytic reactor; and
the particles are adapted to catalyze a reaction between reactants in the feedstream.

11. A hollow fiber element used to provide interaction between minute solid particles and particular component or components of a feedstream, comprising:
a bundle of hollow fibers, each fiber having a wall having effective pore diameters in the range of about 0.05 to 5 μm, each fiber forming a lumen, said bundle having means at each end for sealing the void space between the fibers;
an impermeable casing sealing the side periphery of the bundle;
a vessel encapsulating the bundle;
means sealing the casing against the inside surface of the vessel;
first means for introducing the feedstream into one end of the vessel and second means for removing the stream after interaction from the other end of the vessel;
a charge of individually free, minute solid particles, packing the void space between the fibers substantially throughout its length and breadth, said charge having a density substantially equal to or greater than the free-standing bulk density of the particles, said particles being adapted to interact with the feedstream component or components;
the pores of each fiber wall being smaller than the particles;
said particles being immobilized in the void space but accessible to the feedstream component or components introduced into the lumina in the feedstream.

12. The element as set forth in claim 11, wherein:
the hollow fiber element is an adsorber; and
the particles are adapted to adsorb an absorbate in the feedstream.

13. The element as set forth in claim 4, wherein:
the hollow fiber element is a catalytic reactor; and
the particles are adapted to catalyze a reaction between reactants in the feedstream.

14. A process for packing a hollow fiber element used to provide interaction between minute solid particles and a particular component forming part of a feedstream, comprising:
providing a bundle of hollow fibers, each fiber having a wall having pore openings whose effective diameters are in the range of about 0.05 to 5 μm and permeable relative to the feedstream component but not to the particles, each fiber forming a lumen, said lumina and the void space between the fibers providing, respectively, first and second longitudinal passageways extending through the bundle, each passageway having corresponding first and second ends, said bundle having means at the second end of the first passageway for sealing said first passageway, said bundle having means at the first end of the second passageways for sealing said second passageway, said bundle having an impermeable casing sealing its side periphery;
pumping a suspension or solution of the minute solid particles in a carrier fluid, formed of liquid or gas, under pressure into the first end of the first passageway, said fiber walls being permeable to the carrier fluid, whereby the carrier fluid filters through the fiber walls into the second passageway and exits the element and the particles are retained in the first passageway and accumulate to form a dense, substantially uniform packing of individually free particles, said packing having a density substantially equal to or greater than the free-standing bulk density of the particles; and sealing the first end of the first passageway to immobilize the particle and opening the first end of the second passageway.

15. A process according to claim 14, wherein:
the hollow fiber element is an adsorber;
the particular component of the feedstream is an adsorbate;
the material pumped is a suspension of particles;
the particles are adapted to adsorb the adsorbate; and
the interaction is adsorption of adsorbate by the particles.

16. The process in claim 15 wherein:
the surface area of the particles is at least about 200 $m^2/g$;
the fiber wall has pore openings whose effective diameters are in the range of about 0.05 to 5 micrometers; and
the particle size is less than 30 microns.

17. The process in claim 16 wherein:
the particles are selected from the group consisting of molecular sieve zeolites, silica gel, activated alumina, carbon black and activated carbon.

18. A process according to claim 14, wherein:
the hollow fiber element is a catalytic reactor;
the particular feedstream component is a reactant;
the material pumped is a suspension of particles;
the particles are adapted to catalyze a reaction between reactants; and
the interaction is catalysis of reaction between reactants by the particles.

19. A process according to claim 18, wherein:
the surface area of the particles is at least about 200 $m^2/g$;
the fiber wall has pore openings whose effective diameters are in the range of about 0.5 to 5 micrometers; and
the particle size is less than 30 microns.

* * * * *